Aug. 26, 1958

M. B. SAMPSON 2,849,244

O-RING SEAL FOR ROTARY HYDRAULIC CYLINDER

Filed Dec. 19, 1955

INVENTOR.
MERRITT B. SAMPSON
BY
RICHEY, WATTS, EDGERTON, & McNENNY

ATTORNEYS

Aug. 26, 1958    M. B. SAMPSON    2,849,244
O-RING SEAL FOR ROTARY HYDRAULIC CYLINDER
Filed Dec. 19, 1955    3 Sheets-Sheet 2

INVENTOR.
MERRITT B. SAMPSON
BY
RICHEY, WATTS, EDGERTON & McNENNY
ATTORNEYS

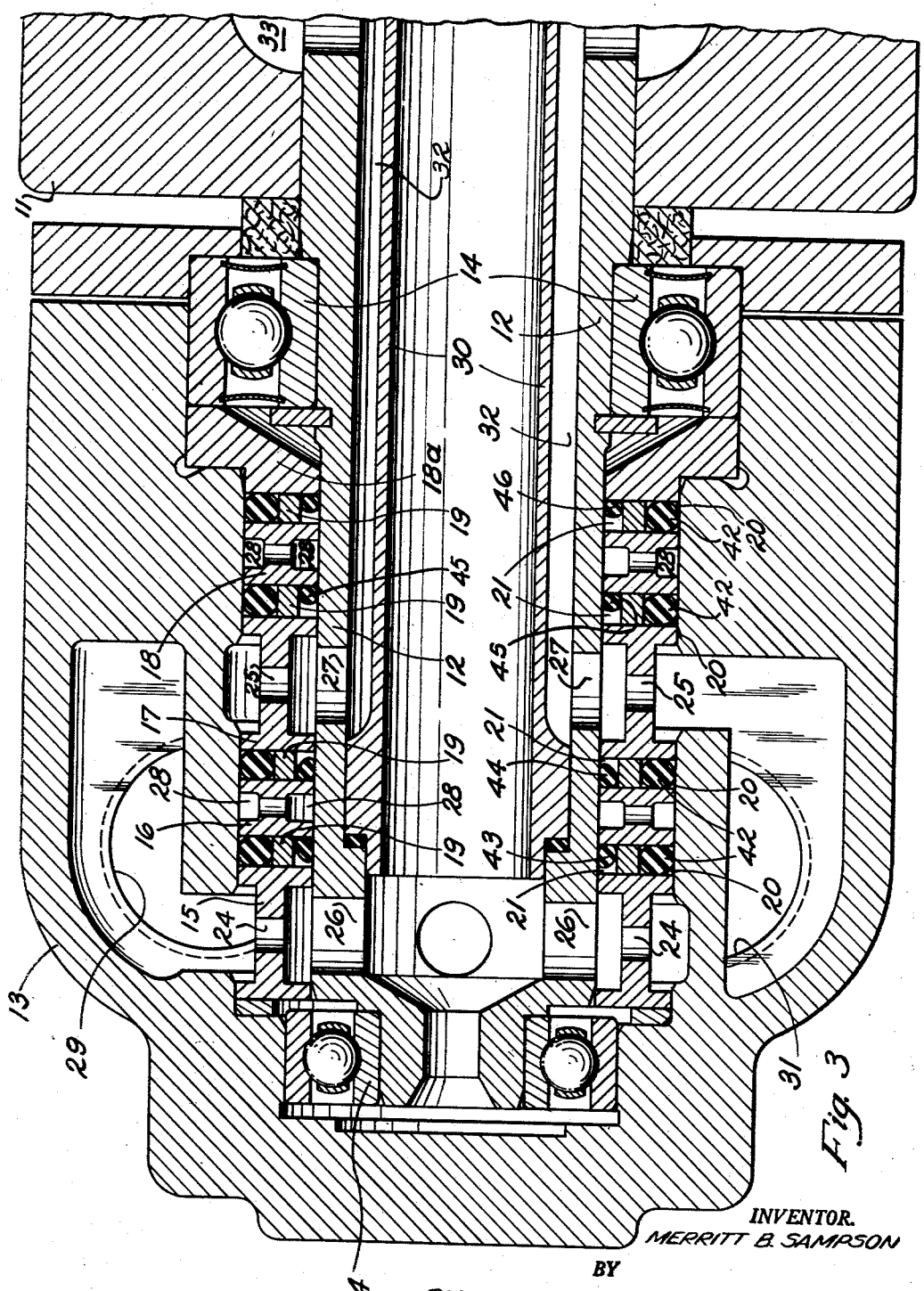

United States Patent Office 2,849,244
Patented Aug. 26, 1958

2,849,244

O-RING SEAL FOR ROTARY HYDRAULIC CYLINDER

Merritt B. Sampson, Chagrin Falls, Ohio, assignor to The S-P Manufacturing Corporation, Cleveland, Ohio, a corporation of Ohio Application December 19, 1955, Serial No. 553,863

2 Claims. (Cl. 285—134)

This invention relates to improvements in O-ring seals and is particularly adapted for use as a seal for dual passages in a rotating cylinder having a reciprocative piston rod therein.

One of the objects of the invention is to provide a seal for a rotating shaft which comprises a plurality of axially spaced concentric channels of rectangular cross section, the outer channels thereof being sealed by static O-rings compressively engaged with the walls of the channels and the inner channels being sealed respectively by dynamic O-rings deformatively engaged with the rotary shaft and one of the side walls of the channel when subjected to the fluid pressure imposed thereon.

Another object of the invention is to provide a simple compact seal for a rotating shaft which is formed to effectively control the passage of fluid between certain channels of the sealing structure assembly, yet restrain escapement thereof from other channels of the assembly.

Another object is to dissipate the deleterious effect of friction on the O-rings in order to facilitate higher operating speeds of the rotating shaft.

Another object is to provide a novel organization of O-rings between dual channels in the sealing assembly, wherein the O-ring nearest the source of fluid pressure is capable of deformation from its toric form to a shape which conforms to the rotating shaft and the face of the downstream mating ring, thus dividing the wear and friction imposed on the O-ring between the shaft and mating ring.

Another object is to provide a novel assembly of O-rings between dual channels in the sealing assembly, wherein the O-ring farthest from the pressure source is capable of sufficient leakage to hold to a minimum pressure gradient across the seal in order to assure an idling condition of the downstream O-ring while the upstream O-ring seals substantially the full pressure drop.

Another object is to provide a novel assembly of O-rings between dual passages in the sealing assembly which will reverse the foregoing characteristics when pressure is alternated between the dual passages so that each O-ring will be lapped with unidirectional sealing faces, thereby increasing the life of the O-ring.

Another object is to provide O-rings of a durometer which will resist deformation to the extent that there will be no cutting of the O-ring by the corner between the mating ring and rotating shaft due to a predetermined maximum pressure.

Another object is to provide an O-ring to seal oil from a pressurized passageway, wherein the O-rings are oversized in relation to the shaft so that the rubber contraction, due to the Joule effect, does not cause excessive heat. More specifically, a structure in which the upstream O-ring acts as a shock absorber for the downstream O-ring which accomplishes the sealing function of the complete pressure gradient until sufficient wear has taken place on the upstream O-ring to pressurize a sump disposed between the upstream and downstream O-rings, thus increasing the service life of the positive seal.

Another object is to provide a separator ring of a thickness which will restrain the O-ring from rolling or snaking in its channel.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 3 is a similar sectional view drawn upon an enlarged scale of a fragmentary portion thereof, the section being taken on the line 3—3 of Fig. 1.

Figure 1:
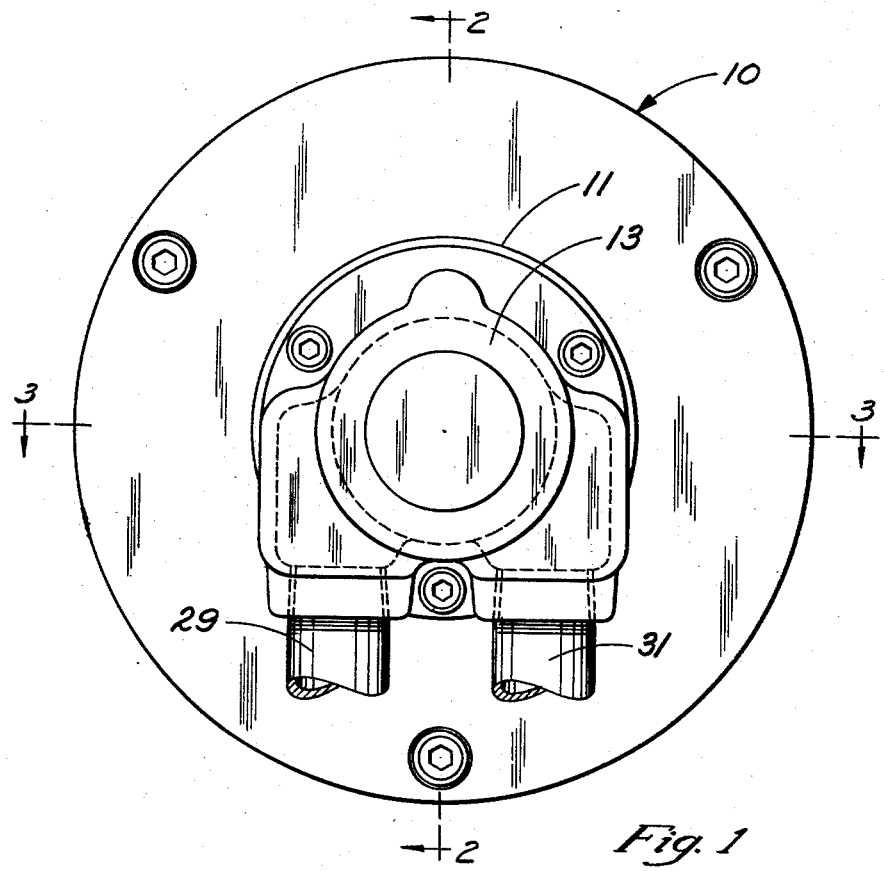
Fig. 1 is an end elevational view of a rotary cylinder including the housing for the improved sealing assembly.

The rotary hydraulic cylinder chosen herein as exemplary of one of the environs within which the improved seal may be used, comprises a cylinder 10 bolted to an adapter plate 11 having a bore in the center thereof for the reception of a shaft or spindle 12 which is formed with an axial bore throughout the major portion of the length thereof. The spindle 12 is mounted in a stationary journal bearing block or housing 13 bored to receive the various elements of the sealing assembly and counterbored adjacent its inner and outer ends for the reception of antifriction bearings 14. The sealing ring assembly embodies a plurality of mating rings 15, 16, 17 and 18, and a plurality of separator rings 19 arranged to define concentric annular grooves 20 and 21. The mating rings 15 and 17 are machined with radial ports 24 and 25 therein communicating respectively with pressure fluid openings 26 and 27, and the mating rings 16 and 18 are radially drilled and machined with grooves in the outer face and bores thereof constituting sumps 28. The housing 13 and spindle 12 are formed with a passageway 29 coupled with a four-way, two position valve (not shown) which, in one position, connects a source of fluid under pressure with the port 24, the openings 26, and the bore in a tube 30 that leads to the inner end of the cylinder. The housing and spindle are further machined with a passageway 31 also coupled with the four-way valve (not shown) which, when adjusted in an alternate position, connects the pressure fluid with the port 25 and the openings 27. The tube 30 is mounted in the bore of the spindle 12 and is formed with a diametrically reduced central portion which forms a canal 32 between the openings 27 and a canal 33 in the adapter and wall of the cylinder that leads to the outer end of the latter. The piston 34 in the cylinder 10 is bored in the center thereof to receive a piston rod 35 which is drilled and tapped to receive a draw rod (not shown) for actuating the chuck or other mechanism coupled therewith.

The cylinder is counterbored in the outer end thereof for the retention of a packing material 36 to restrain escapement of the fluid from the cylinder and the packing is retained in place by a snap ring 37 seated in a groove 38 in the cylinder counterbore. The circumferential wall of the piston is machined with a groove 39 therein to support an O-ring seal and the rearward face of the piston is counterbored for the reception of a nut 40 threaded upon a diametrically reduced end portion of the piston rod 35. The adapter plate 11, the cylinder 10 and the body of the piston 34, are drilled and reamed to receive a dowel pin 41 which restrains rotation of the piston during the reciprocative movement thereof.

The mating rings 15, 16, 17 and 18 in the bearing block 13 are bored for running clearance over the spindle 12, and the circumferential faces of the rings 15 and 17 are grooved to assure the free passage of pressure fluid through the shaft clearance. The grooves 20 are provided with static O-rings 42 compressively and deformatively engaged with the walls of the mating rings, the separator rings, and the bore in the housing 13. The grooves 21 are provided with dynamic O-rings 43, 44, 45 and 46 formed to engage the spindle 12 and for lateral clearance with the walls of the groove.

The diametric dimensions of the O-rings 45 and 46 are proportioned relative to the diametric dimensions of the grooves or cavities 21 so that a sufficient degree of impingement is imposed upon the spindle and on the inner faces of the separator rings 19 to arrest fluid leakage at pressures from 0 to 750 p. s. i.

The O-rings 43 and 44 are formed to provide substantial lateral clearance with the mating rings 15 and 16, and 16 and 17 respectively and slight diametric clearance with the separator rings 19, but are compressively engaged with the spindle to the degree attained by drawing the rings over the spindle under slight tension. Although this construction will by-pass fluid at low pressures, it is immaterial in view of the mode of operation of the assembly, as hereinafter explained.

Figure 4:
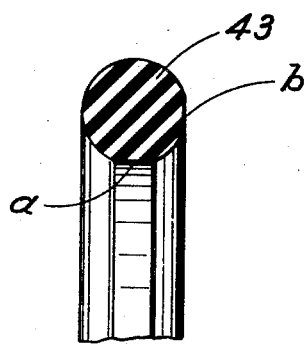
Fig. 4 is an enlarged detail view, shown in section, of one of the O-rings illustrated in its deformed condition.
Figure 2:
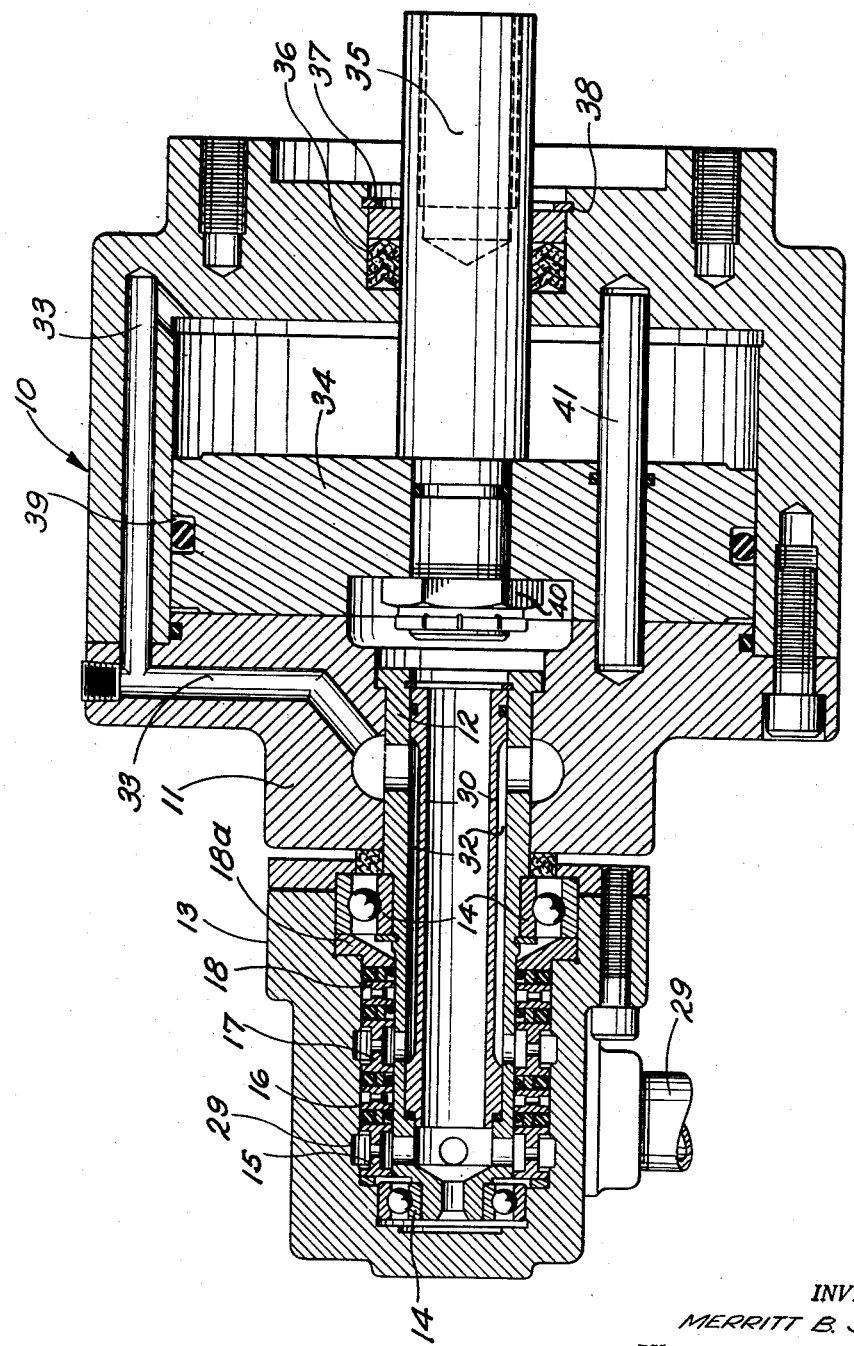
Fig. 2 is a longitudinal sectional view through a rotary cylinder assembly of a draw bar type power operated chuck, the section being taken on the line 2—2 of Fig. 1.

During the operative cycle of the piston cylinder assembly, when the four-way valve is adjusted to position the piston in its extended position, high pressure oil is supplied to the spindle sealing mechanism through the ports 24. At this time, pressure in the ports 25 is zero. Since the cylinder is connected directly to the source of pressure fluid and the O-rings 45 and 46 have no pressure bias action thereon, there is very little friction upon the rotative shaft. The only friction imposed upon the O-rings is the compressive effort described above. At this time, the O-ring 43 is in its fully deformed condition, engaging the spindle and the mating ring 16 only, and clearing the separator rings 19. The maximum frictional effort of ring 43 upon the spindle is less than the maximum frictional effort of the rings 45 and 46, since it does not have the added compressive impingement imposed upon the spindle by the rings 45 and 46. After operation of the seal for approximately 100 hours, the O-ring 43 takes a permanent set and the flattened faces $a$ and $b$ (Fig. 4) are lapped in the portions thereof that engages the spindle 12 and the mating ring 16. Since the O-ring life is a function of local temperature, when all other variables remain the same, it follows that localized friction is reduced by this method of sealing. Upon the initial adjustment of the valve, a wave of pressure fluid will flow through the ports 24, the spindle clearance, and over or about the ring 43. This condition, however, is but momentary, since the pressure load on the ring 43, caused by the resistance of the piston 34, will deform the ring and close the opening between the spindle and the inner side wall of the mating ring 16. During the period in which the pressure fluid by-passes the ring 43, the sump 28 in the ring 16 will be filled and the sealing engagement of the ring 44 with the spindle and the side wall of the mating ring 16, will be relaxed. When the valve is reversed, the pressure fluid will flow through the passageway 31, the ports 25 and the openings 27, reversing the foregoing condition and deforming the O-rings 44 and 45 into sealed engagement with the spindle and side wall of the mating ring 18 and the end plate 18$a$ respectively. The mode of operation of this structure, and the efficiency thereof resides in the unidirectional movement of the O-rings 43 and 44. Since the hole and one face only, of each of the O-rings 43 and 44, are worn in or lapped to the spindle and mating ring during this operation, these rings will out-wear other rings subjected to constant alternate deformation and relapping. If the rings were double-acting, they would fail in a very few hours.

The frictional load is greatest when the piston position is reversed, since the pressure in the ports 25 is zero under optimum pressure in the ports 24, and conversely the pressure in the ports 24 is zero when the pressure is at its peak in the ports 25. This maximum frictional load is due to the fully deformed condition of the O-rings 44 and 46, or the O-rings 44 and 45, but never all three. If the O-ring 45 leaks, the fluid will form a pressure balance and will not add materially to the frictional heat acceleration. Tests indicate no difficulty resulting from the amount of heat generated by the seals 45 and 46 when operating under full load with pressure in ports 25 only. But failure of the O-rings 43 or 44 has been found after a few hours of operation when the pressure was alternated between the ports 24 and 25 with a double-acting rotary O-ring, i. e., O-rings alternately deformed by pressure first on one side and then the other. The constant reworking of the rubber molecules into a new physical shape, causes excessive internal friction and a consequent rise in temperature after the first few minutes of O-ring operation.

The principle embodied in the improved seal resides in the uniform deformation of the rings under high pressure operation. The pressure imposed on rings 43 and 44 always comes from the same direction, hence, there is no internal working of the rubber and only one form or shape into which the body of the O-ring is deformed during the life thereof. As the O-ring seals 43 and 44 wear, the friction contact surfaces thereof will become broader and highly polished, since, the reverse pressure is very slight and does not tend to deform the rings or destroy the lapped faces. The fact that the O-ring shrinks, due to the Joule effect, tends to help the seal of the toric ring with the rotating shaft. The O-ring fits very lightly over the shaft to minimize this effect.

When the O-rings 43 and 44 assume a differential speed, the friction between the ring and the shaft is materially less since friction (which is a function of speed) has been cut in half. Likewise, the speed of the O-rings 43 or 44, relative to the stationary mating ring, is cut in half and friction is materially reduced. When the O-ring attains an intermediate speed, there are two separate paths of heat dissipation, one through the rotating shaft, and the other through the mating ring. There would not be two paths if the O-rings remained stationary, since the polymeric material is a good heat insulator.

It is, moreover, essential to provide liberal side clearance in the order of approximately one diameter of the O-rings to prevent snaking or rolling of the O-rings 43 and 44.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A spindle seal in a fluid control unit for a rotary hydraulic cylinder having therein a piston reciprocated by fluid pressure, said piston having an inner and an outer face, comprising a stationary housing having a bore and a pair of fluid inlet openings therein, an axially locked rotary spindle in said housing having axial and radial bores therein leading from one of said inlet openings to conduct fluid under pressure to the outer face of the piston, said spindle having a radial bore axially spaced from the said first mentioned radial bores, a sleeve in said spindle having a diametrically reduced portion defining with said second mentioned radial bore a passageway leading from the other fluid inlet opening to conduct fluid under pressure to the inner face of the piston, a sealing ring assembly positioned within the bore of the housing and comprising spaced mating rings engaged with the housing and having a running clearance with the spindle, one of said mating rings having radial ports therein communicating with one of said fluid inlet openings, another of said mating rings spaced from the first named mating ring and having radial ports therein communicating with the other of said fluid inlet openings, another mating ring positioned between the said mating rings that communicate with said inlet openings, said last named mating ring having radial openings therein constituting a sump, the contiguous faces of adjacent mating rings being smooth, flat and parallel to one another, a plurality of pairs of concentric O-rings interposed between and engageable with each pair of contiguous faces of adjacent mating rings, separator rings interposed between each pair of said concentric O-rings and the faces of said mating rings, the outer rings of each pair of said O-rings being in static engagement with said housing and the contiguous faces of adjacent mating rings, and the other of each pair of O-rings being in engagement with said spindle and at least a smooth face of one of said mating rings, said last named O-rings constituting sealing rings, at least one of said inner sealing rings being deformable and movable into engagement with said spindle and a face of a mating ring by the pressure of fluid flowing towards the inner face of said piston, and another sealing ring being deformable and movable into engagement with said spindle and another face of a mating ring by the pressure of fluid flowing toward the outer face of said piston, whereby said inner sealing rings are maintained in a substantially fixed axial position.

2. A spindle seal in a fluid control unit for a rotary hydraulic cylinder having a fluid operated reciprocable piston therein, inner and outer faces on said piston, said control unit comprising a stationary housing having a bore therein and a pair of fluid inlet openings, a rotary spindle in said housing locked against axial movement and having an axial bore therein and intercommunicating radial ports providing fluid communication between one of said inlet openings and the outer face of said piston, said spindle having secondary radial ports therein axially spaced from said first named ports, a sleeve in said spindle having a diametrically reduced portion defining together with said second named ports a passageway providing fluid communication from the other fluid inlet opening to the inner face of the piston, anti-friction bearings in each of said housing supporting said spindle and provided to assure the rotational alignment thereof, spaced mating rings engaged in said bore in the housing and having a running clearance with said spindle, one of said mating rings having radial ports therein communicating with one of said fluid inlet openings, a second mating ring axially spaced from the first named mating ring and having radial ports therein communicating with the other of said fluid inlet openings, a third mating ring between said first and second named mating rings and having inner and outer circumferential grooves and radial openings therein communicating with said circumferential grooves and constituting a sump, the contiguous faces of adjacent mating rings being smooth, flat and parallel to one another, a plurality of pairs of concentric O-rings between confronting faces of each pair of adjacent mating rings, separator rings disposed between the faces of each pair of said mating rings, the outer rings of each pair of said O-rings being in static engagement with said housing and the confronting faces of adjacent mating rings and the inner O-rings of each pair of O-rings being engaged with said spindle and one face of said mating rings, said last named O-rings constituting sealing rings, one of said sealing rings being deformable into engagement with said spindle and the face of a mating ring against which it is biased by fluid flowing towards the inner face of said piston, and another of said sealing rings being deformable into engagement with said spindle and a face of another mating ring against which it is biased by fluid flowing toward the outer face of said piston, whereby said sealing rings are maintained in a substantially fixed axial position and wear occurs only on the inner diameter and one side of the circumferential face thereof.

References Cited in the file of this patent

UNITED STATES PATENTS

| | | |
|---|---|---|
| 1,851,723 | Neidow | Mar. 29, 1932 |
| 2,451,269 | Allen et al. | Oct. 12, 1948 |
| 2,536,565 | Ostergren | Jan. 2, 1951 |
| 2,577,858 | Sampson | Dec. 11, 1951 |
| 2,626,166 | Fawick | Jan. 20, 1953 |
| 2,645,450 | Chessman | July 14, 1953 |
| 2,659,615 | McClain | Nov. 17, 1953 |
| 2,701,146 | Warren | Feb. 1, 1955 |